US009236957B2

(12) United States Patent
Bolton et al.

(10) Patent No.: US 9,236,957 B2
(45) Date of Patent: Jan. 12, 2016

(54) TECHNIQUE TO REDUCE THE THIRD HARMONIC OF AN ON-STATE RF SWITCH

(71) Applicant: RF Micro Devices, Inc., Greensboro, NC (US)

(72) Inventors: Eric K. Bolton, Kernersville, NC (US); Daniel Charles Kerr, Oak Ridge, NC (US); Marcus Granger-Jones, Scotts Valley, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 71 days.

(21) Appl. No.: 14/271,921

(22) Filed: May 7, 2014

(65) Prior Publication Data

US 2014/0335801 A1 Nov. 13, 2014

Related U.S. Application Data

(60) Provisional application No. 61/820,319, filed on May 7, 2013.

(51) Int. Cl.
*H04B 1/44* (2006.01)
*H04B 15/02* (2006.01)

(52) U.S. Cl.
CPC ...................... *H04B 15/02* (2013.01)

(58) Field of Classification Search
CPC ....................................................... H04B 15/02
USPC ............ 455/83, 77, 114.1, 191.3, 193.1, 227, 455/241.1, 323
See application file for complete search history.

(56) References Cited

U.S. PATENT DOCUMENTS

| 8,200,181 | B1* | 6/2012 | Khlat | H04B 1/0057 455/311 |
| 8,325,632 | B2* | 12/2012 | Gorbachov | H04B 1/48 343/835 |
| 9,020,451 | B2* | 4/2015 | Khlat | H03H 21/0021 455/127.1 |
| 2007/0222697 | A1* | 9/2007 | Caimi | H01Q 1/243 343/861 |
| 2011/0165848 | A1* | 7/2011 | Gorbachov | H04B 1/0064 455/78 |
| 2014/0227982 | A1* | 8/2014 | Granger-Jones | H04B 7/0404 455/77 |
| 2014/0247757 | A1* | 9/2014 | Rimini | H04B 1/44 370/278 |
| 2014/0266415 | A1* | 9/2014 | Kerr | H03K 17/693 327/552 |

* cited by examiner

*Primary Examiner* — Marceau Milord
(74) *Attorney, Agent, or Firm* — Withrow & Terranova, P.L.L.C.

(57) ABSTRACT

RF switching circuitry includes an RF switch coupled between an input node and an output node. Distortion compensation circuitry is coupled in parallel with the RF switch between the input node and the output node. The RF switch is configured to selectively pass an RF signal from the input node to the output node based on a first switching control signal. The distortion compensation circuitry is configured to boost a portion of the RF signal that is being compressed by the RF switch when the amplitude of the RF signal is above a predetermined threshold by selectively injecting current into one of the input node or the output node. Boosting a portion of the RF signal that is being compressed by the RF switch allows a signal passing through the RF switch to remain substantially linear, thereby improving the performance of the RF switching circuitry.

33 Claims, 13 Drawing Sheets

US 9,236,957 B2

TECHNIQUE TO REDUCE THE THIRD HARMONIC OF AN ON-STATE RF SWITCH

RELATED APPLICATIONS

This application claims the benefit of U.S. provisional patent application Ser. No. 61/820,319, filed May 7, 2013, the disclosure of which is incorporated herein by reference in its entirety.

FIELD OF THE DISCLOSURE

The present disclosure relates to RF switching circuitry. Specifically, the present disclosure relates to RF switching circuitry including distortion compensation circuitry for cancelling harmonic distortion generated by one or more RF switching elements in the RF switching circuitry.

BACKGROUND

Modern mobile devices continue to demand increasing rates of data exchange. One way to increase the rate of data exchange of a mobile device is by simultaneously transmitting and receiving radio frequency (RF) signals from a single antenna in the mobile device. Although effective at increasing the rate of data exchange that the mobile device is capable of achieving, the simultaneous use of a single antenna for transmitting and receiving signals can result in interference between transmit and receive circuitry in the front end of the mobile device. The interference between the transmit and receive circuitry may be especially problematic for certain combinations of transmit and receive frequencies, such that the mobile device may become unusable in these frequency combinations.

FIG. 1 shows exemplary mobile device front end circuitry 10 for transmitting and receiving RF signals from an antenna 12. The mobile device front end circuitry 10 includes a plurality of low band ports 14, a plurality of high band ports 16, a low band duplexer 18, a high band duplexer 20, low band switching circuitry 22, high band switching circuitry 24, a diplexer 26, and antenna tuning circuitry 28. The plurality of low band ports 14 are coupled to the low band switching circuitry 22 through the low band duplexer 18. Similarly, the plurality of high band ports 16 are coupled to the high band switching circuitry 24 through the high band duplexer 20. Both the low band switching circuitry 22 and the high band switching circuitry 24 are coupled to the diplexer 26, which is in turn coupled to the antenna 12 through the antenna tuning circuitry 28.

In a receive mode of operation, an RF signal is received at the antenna 12, which is passed through the antenna tuning circuitry 28 to the diplexer 26, where it is separated into a low band signal component and a high band signal component. The low band signal component is delivered to the low band switching circuitry 22, where it is then delivered to an appropriate one of the plurality of low band ports 14 through the low band duplexer 18 so that it may be further processed by low band receive circuitry (not shown). The high band signal component is delivered to the high band switching circuitry 24, where it is then delivered to an appropriate one of the plurality of high band ports 16 through the high band duplexer 20 so that it may be further processed by high band receive circuitry (not shown).

In a transmit mode of operation, a transmit signal is provided to an appropriate one of the plurality of low band ports 14 or an appropriate one of the plurality of high band ports 16 from transmit circuitry (not shown). The transmit signal is passed through either the low band switching circuitry 22 or the high band switching circuitry 24 to the diplexer 26, where it is subsequently delivered to the antenna 12 through the antenna tuning circuitry 28. As will be appreciated by those of ordinary skill in the art, the antenna tuning circuitry 28 may include one or more RF switching elements for connecting various components to the antenna 12 in order to alter the impedance presented to the antenna 12. The RF switching elements in the antenna tuning circuitry 28 may be nonlinear, and therefore may generate harmonics of signals passed between the antenna 12 and the diplexer 26.

In certain combinations of transmit and receive frequencies, harmonic components of a transmit signal may fall within the signal band of a receive signal. This may lead to harmonic distortion generated from the transmit signal flowing back through the diplexer 26 and into the receive circuitry. Because the transmit signal is generally a much higher amplitude signal than the receive circuitry is designed to handle, the harmonic distortion may overpower and desensitize the receive circuitry, thereby impeding the performance of the mobile device front end circuitry 10 or rendering it unusable altogether. For example, when transmitting in Band 17 (704-716 MHz), the third harmonic of the transmit signal falls within a Band 4 receive signal (2110-2155 MHz). Accordingly, distortion about the third harmonic of Band 17 generated due to the RF switching components in the antenna tuning circuitry 28 will travel back through the diplexer 26 and into the Band 4 receive circuitry, causing desensitization of the receive circuitry and degrading the performance of the mobile device front end circuitry 10.

FIGS. 2A-2F show conventional RF switching circuitry 30 that may be used in the antenna tuning circuitry 28 of FIG. 1 in a variety of configurations. FIG. 2A shows conventional RF switching circuitry 30 including a plurality of RF switching elements M_RF and adapted to operate in a series configuration, wherein a signal presented at an input node 32 is selectively passed to an output node 34 based on a control signal delivered to a control port 36. FIG. 2B shows conventional RF switching circuitry 30 adapted to operate in a series configuration, wherein the series equivalent of a first tuning capacitor C_TN1 and a second tuning capacitor C_TN2 is selectively presented between an input node 32 and an output node 34 based on a control signal delivered to a control port 36. FIG. 2C shows conventional RF switching circuitry 30 adapted to operate in a series configuration, wherein the series equivalent of a first tuning inductor L_TN1 and a second tuning inductor L_TN2 is selectively presented between an input node 32 and an output node 34 based on a control signal delivered to a control port 36. FIG. 2D shows conventional RF switching circuitry 30 adapted to operate in a shunt configuration, wherein a signal presented at an input node 32 is selectively shorted to ground. FIG. 2E shows conventional RF switching circuitry 30 including a tuning capacitor C_TN and adapted to operate in a shunt configuration, wherein a signal presented at an input node 32 is selectively shorted to ground through the tuning capacitor C_TN. FIG. 2F shows conventional RF switching circuitry 30 including a tuning inductor L_TN and adapted to operate in a shunt configuration, wherein a signal presented at an input node 32 is selectively shorted to ground through the tuning inductor L_TN. As will be appreciated by those of ordinary skill in the art, the antenna tuning circuitry 28 may contain RF switching circuitry 30 in any of the previously mentioned configurations in order to alter the impedance presented to the antenna 12.

As discussed above, while the RF switching circuitry 30 may allow tuning of the impedance presented to the antenna 12 in order to increase the efficiency of the mobile device front end circuitry 10, each one of the RF switching elements M_RF may generate harmonic distortion about a passing signal. The generated harmonic distortion may cause interference between transmit and receive circuitry in the mobile device front end circuitry 10, thereby degrading the performance of the circuitry.

Accordingly, there is a need for RF switching circuitry that is capable of passing RF signals while simultaneously reducing or eliminating the generation of harmonic distortion.

SUMMARY

RF switching circuitry includes an RF switch coupled between an input node and an output node. Distortion compensation circuitry is coupled in parallel with the RF switch between the input node and the output node. The RF switch is configured to selectively pass an RF signal from the input node to the output node based on a first switching control signal. The distortion compensation circuitry is configured to boost a portion of the RF signal that is being compressed by the RF switch when the amplitude of the RF signal is above a predetermined threshold by selectively injecting current into one of the input node or the output node. Boosting a portion of the RF signal that is being compressed by the RF switch allows a signal passing through the RF switch to remain substantially linear, thereby improving the performance of the RF switching circuitry.

According to one embodiment, the distortion compensation circuitry includes a compensation switch and an anti-parallel diode pair coupled in series with the compensation switch.

According to one embodiment, the compensation switch is closed during the ON state of the RF switching element and opened during an OFF state of the RF switching element.

According to one embodiment, the anti-parallel diodes are coupled in series between the first compensation switch and a second compensation switch, such that the load seen at the input node and the output node is balanced. A third compensation switch is coupled in parallel with the anti-parallel diodes. The first compensation switch and the second compensation switch are closed during the ON state of the RF switch and opened during an OFF state of the RF switch. The third compensation switch is open during the ON state of the RF switch and closed during an OFF state of the RF switch.

According to one embodiment, the distortion compensation circuitry is isolated from the RF switch by one or more isolation capacitors. The isolation capacitors enable the independent biasing of the RF switch and the compensation circuitry, thereby allowing the independent operation of each.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
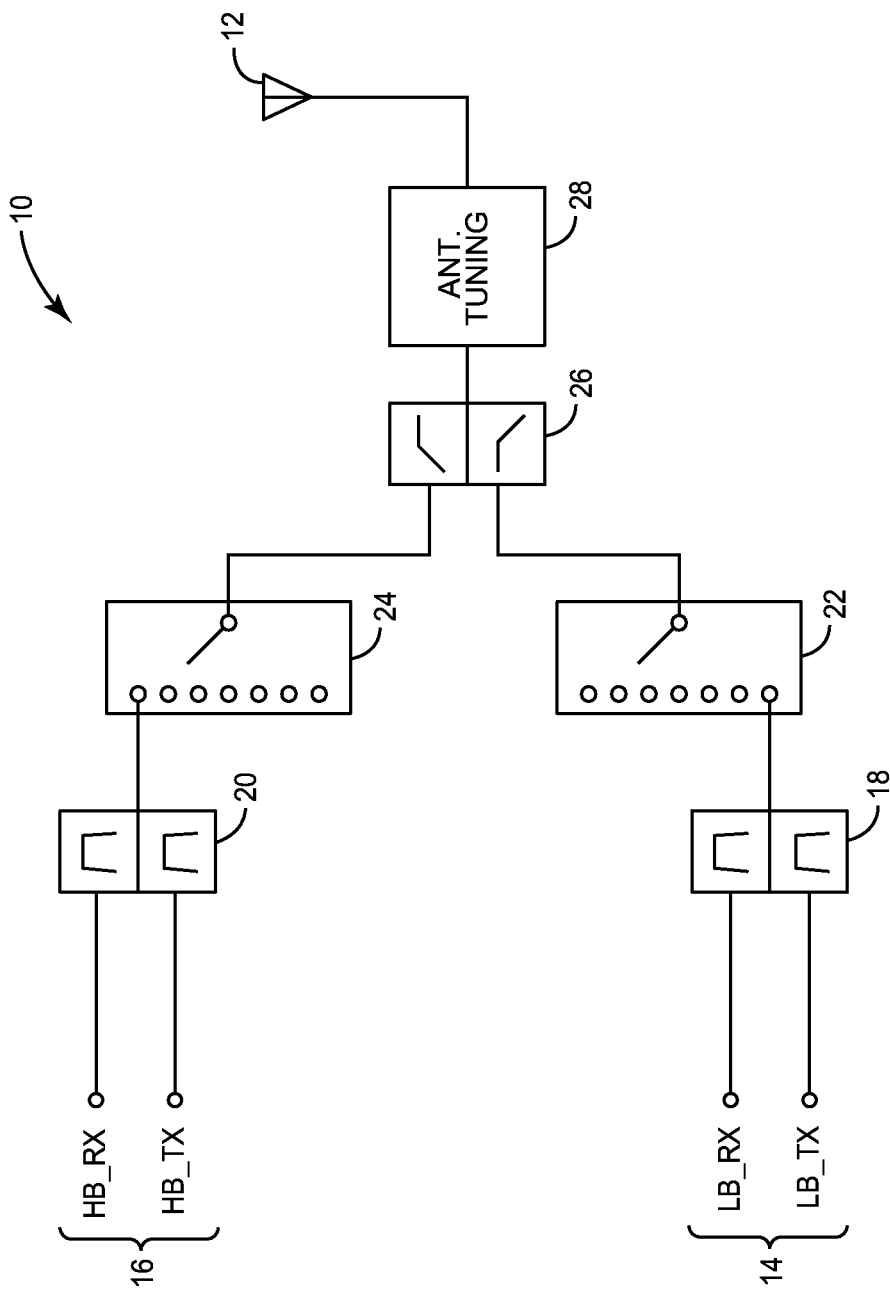
FIG. 1 shows a diagram illustrating conventional radio frequency front end circuitry.
Figures 2A, 2B, 2C, 2D, 2E, 2F:
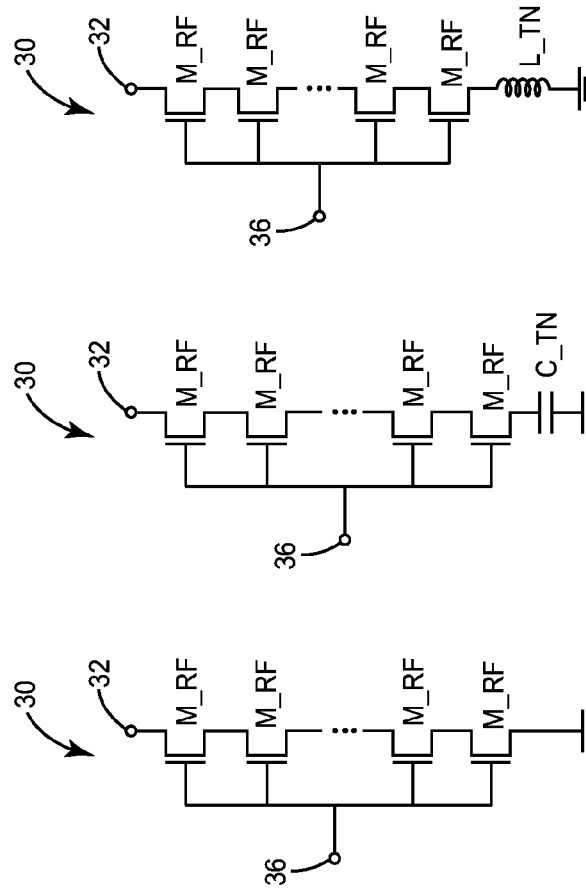
FIGS. 2A-2F show schematic representations of a plurality of conventional RF switch configurations.
Figure 3:
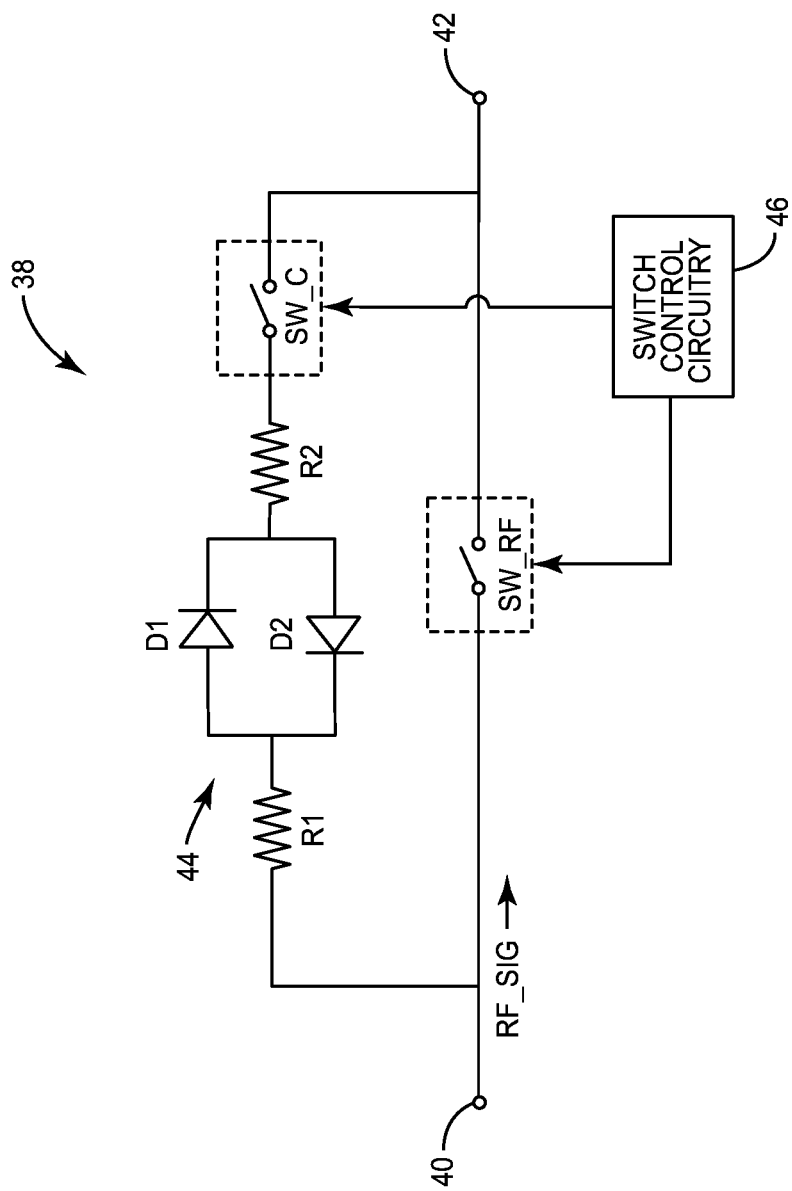
FIG. 3 shows a schematic representation of radio frequency switching circuitry including compensation circuitry according to one embodiment of the present disclosure.

Turning now to FIG. 3, RF switching circuitry 38 is shown according to one embodiment of the present disclosure. The RF switching circuitry includes an RF switch SW_RF coupled in parallel with distortion compensation circuitry 44 between an input node 40 and an output node 42. The distortion compensation circuitry 44 includes a first compensation resistor R1, a second compensation resistor R2, a first compensation diode D1, a second compensation diode D2, and a compensation switch SW_C. The first compensation diode D1 and the second compensation diode D2 are coupled in an anti-parallel configuration between the first compensation resistor R1 and the second compensation resistor R2, such that the first compensation resistor R1, the pair of anti-parallel compensation diodes D1 and D2, and the second compensation resistor R2 are coupled in series between the input node 40 and the compensation switch SW_C. The compensation switch SW_C is coupled between the second compensation resistor R2 and the output node 42. Switch control circuitry 46 may be coupled to the RF switch SW_RF and the compensation switch SW_C.

In operation, an RF signal RF_SIG is delivered to the input node 40 of the RF switching circuitry 38, where it is selectively forwarded via the RF switch SW_RF to the output node 42 based on a control signal provided to the RF switch SW_RF from the switch control circuitry 46. In the ON state of the RF switching circuitry 38, both the RF switch SW_RF and the compensation switch SW_C are closed. As will be appreciated by those of ordinary skill in the art, the RF switch SW_RF may have a non-linear gain response, which results in compression of the RF signal RF_SIG at the output node 42 as the amplitude of the RF signal RF_SIG rises above a given threshold. As discussed above, compression of the RF signal RF_SIG may result in distortion in the RF signal RF_SIG about one or more harmonic frequencies. Accordingly, the distortion compensation circuitry 44 is provided in order to prevent compression at the output node 42 as the amplitude of the RF signal RF_SIG increases.

Due to the internal resistance of the RF switch SW_RF, as current from the RF signal RF_SIG flows through the RF switch SW_RF, a differential voltage, defined as the difference between the voltage at the output node 42 and the voltage at the input node 40, is generated. As the differential voltage between the input node 40 and the output node 42 rises above a threshold value, one of the first compensation diode D1 or the second compensation diode D2 will become forward biased, thereby injecting current into either the input node 40 or the output node 42, depending upon the polarity of the differential voltage, as discussed in further detail below. Accordingly, a portion of the RF signal RF_SIG is boosted, thereby preventing compression of the RF signal RF_SIG at the output node 42.

In the OFF state of the RF switching circuitry 38, both the RF switch SW_RF and the compensation switch SW_C are open, thereby preventing the flow of current between the input node 40 and the output node 42.

Figure 4:
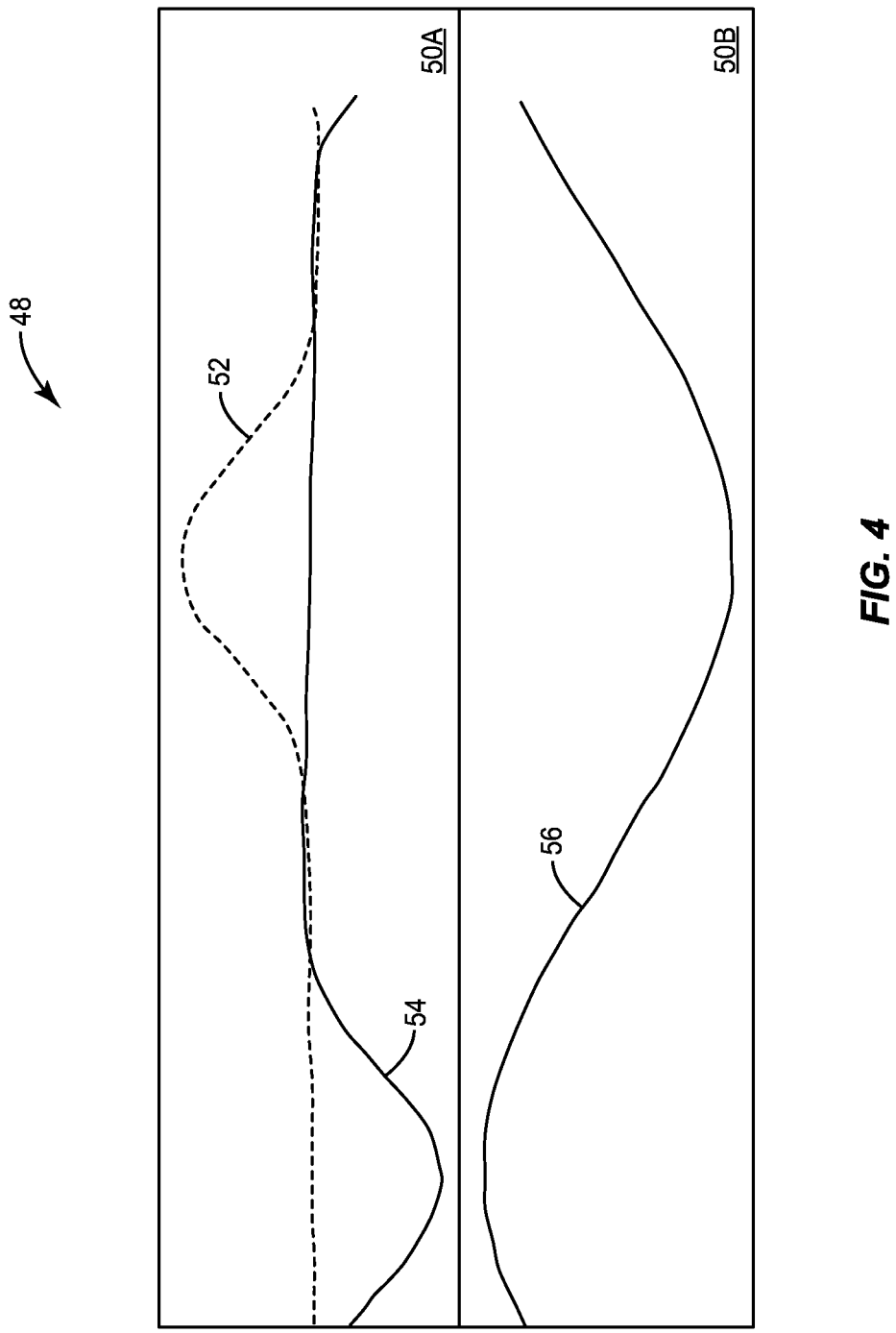
FIG. 4 shows graph illustrating the operation of the radio frequency switching circuitry including compensation circuitry of FIG. 3 according to one embodiment of the present disclosure.

FIG. 4 is a graph 48 illustrating the described functionality of the RF switching circuitry 38 shown in FIG. 3. In a first section 50A of the graph 48, a dotted line 52 represents the amount of current through the first compensation diode D1, while a solid line 54 represents the amount of current through the second compensation diode D2. In a second section 50B of the graph 48, a solid line 56 represents the differential voltage across the RF switch SW_RF. As shown by the graph 48, as the differential voltage rises above a certain positive threshold, such that the output node 42 is at a voltage higher than the input node 40 and the voltage across the second compensation diode D2 exceeds the threshold voltage of the device, the second compensation diode D2 becomes forward biased, thereby allowing current to flow from the output node 42 to the input node 40.

Similarly, as the differential voltage across the RF switch SW_RF falls below a certain negative threshold, such that the voltage at the input node 40 is higher than the voltage at the output node 42 and the voltage across the first compensation diode D1 exceeds the threshold voltage of the device, the first compensation diode D1 becomes forward biased, thereby allowing current to flow from the input node 40 to the output node 42.

Figure 5:
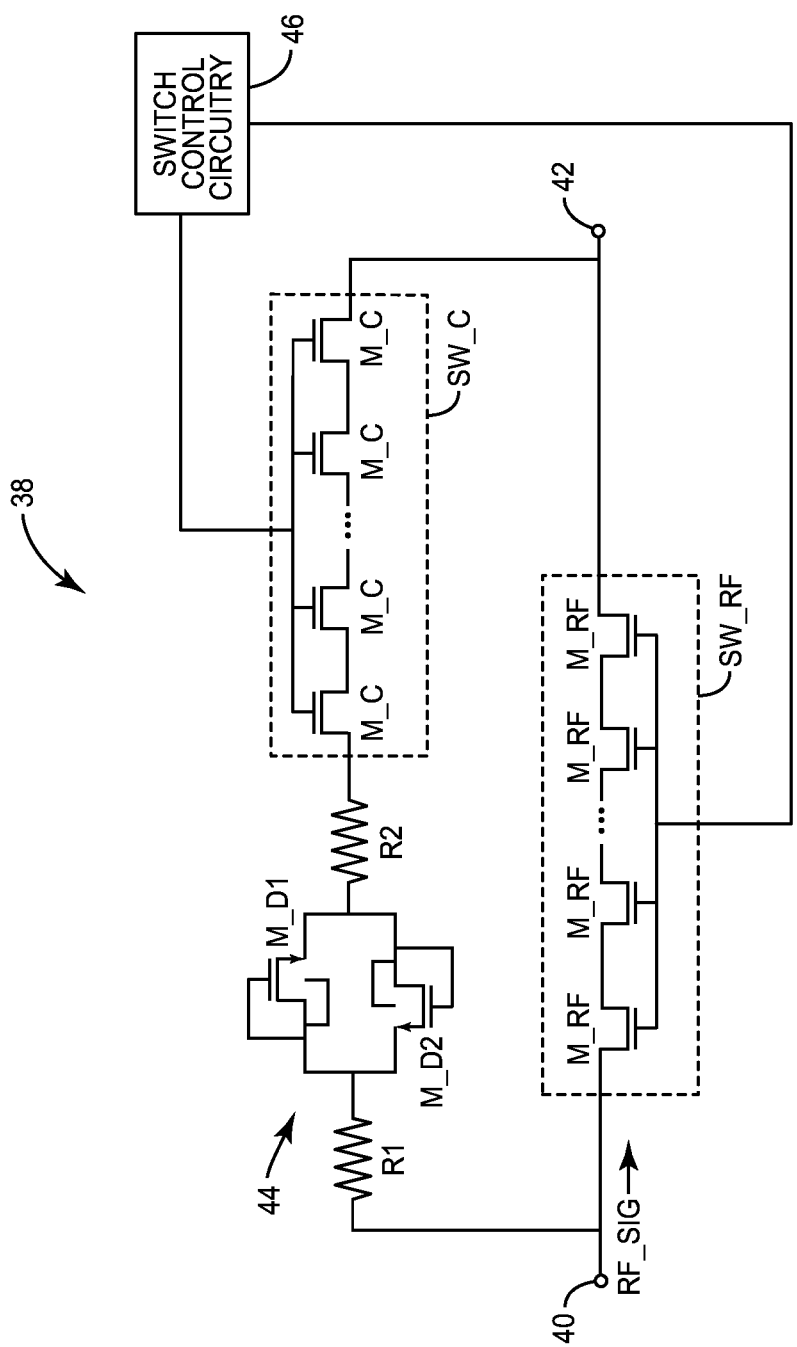
FIG. 5 shows a schematic representation of the radio frequency switching circuitry of FIG. 3 including details of the radio frequency switching circuitry according to one embodiment of the present disclosure.

FIG. 5 shows details of the RF switching circuitry 38 shown in FIG. 3. As shown in FIG. 5, the RF switch SW_RF may comprise a plurality of RF switching elements M_RF coupled in series between the input node 40 and the output node 42. The RF switching elements M_RF may be transistor devices such as metal-oxide-semiconductor field-effect transistors (MOSFETs), field-effect transistors (FETs), or the like. Accordingly, the source and drain contacts of each one of the RF switching elements M_RF may be coupled in series as shown, while the gate contacts of each one of the RF switching elements M_RF may be coupled together to form a control port for the RF switch SW_RF, which may be coupled to the switch control circuitry 46. As will be appreciated by those of ordinary skill in the art, providing the plurality of RF switching elements M_RF coupled in series allows the RF switch SW_RF to handle larger amplitude signals without damage to the device.

Similar to the RF switch SW_RF, the compensation switch SW_C may also comprise a plurality of compensation switching elements M_C coupled in series between the second compensation resistor R2 and the output node 42. The compensation switching elements M_C may be transistor devices such as MOSFETs, FETs, or the like. Accordingly, the source and drain contacts of each one of the compensation switching elements M_C may be coupled in series as shown, while the gate contacts of each one of the compensation switching elements M_C may be coupled together to form a control port for the compensation switch SW_C, which may be coupled to the switch control circuitry 46. As will be appreciated by those of ordinary skill in the art, providing the plurality of compensation switching elements M_C coupled in series allows the compensation switch SW_C to handle larger amplitude signals without damage to the device.

Additionally, the first compensation diode D1 may be a first diode-connected transistor M_D1, and the second compensation diode D2 may be a second diode-connected transistor M_D2. Specifically, the gate contact of each one of the first diode-connected transistor M_D1 and the second diode-connected transistor M_D2 may be coupled to the drain contact of the first diode-connected transistor M_D1 and the second diode connected transistor M_D2, respectively. Further, the body contact of each one of the first diode-connected transistor M_D1 and the second diode-connected transistor M_D2 may be connected to the drain contact of the first diode-connected transistor M_D1 and the second diode-connected transistor M_D2, respectively. Finally, the source contact of the second diode-connected transistor M_D2 may be coupled to the drain contact of the first diode-connected transistor M_D1, and the source contact of the first diode-connected transistor M_D1 may be coupled to the drain contact of the second diode-connected transistor M_D2.

Figure 6:
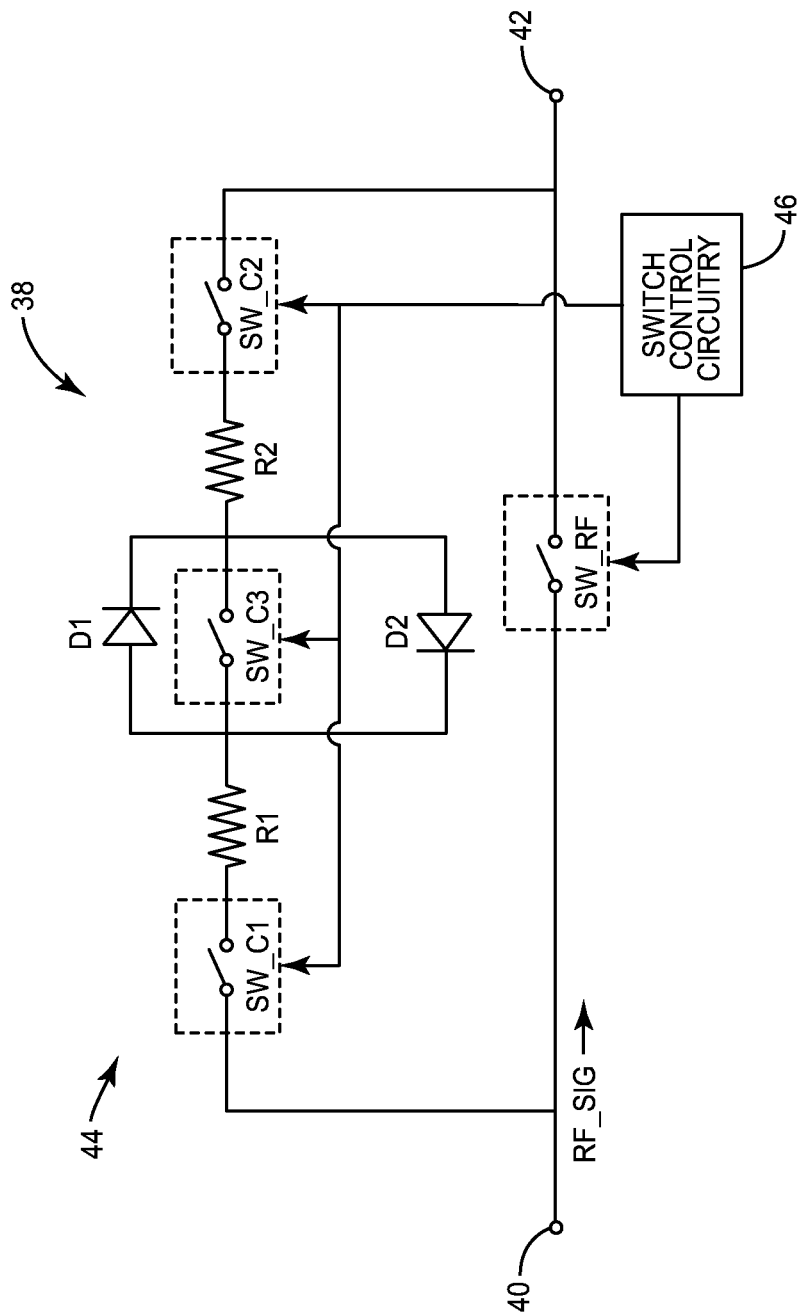
FIG. 6 shows a schematic representation of radio frequency switching circuitry including compensation circuitry according to an additional embodiment of the present disclosure.

FIG. 6 shows the RF switching circuitry 38 according to an additional embodiment of the present disclosure. The RF switching circuitry 38 shown in FIG. 6 is substantially similar to that shown in FIG. 3, but further includes two additional compensation switches, such that the RF switching circuitry 38 includes a first compensation switch SW_C1, a second compensation switch SW_C2, and a third compensation switch SW_C3. The first compensation switch SW_C1 is coupled between the input node 40 and the first compensation resistor R1. The second compensation switch SW_C2 is coupled between the second compensation resistor R2 and the output node 42. The third compensation switch SW_C3 is coupled in parallel with the first compensation diode D1 and the second compensation diode D2. Notably, while the RF switch SW_RF, the first compensation switch SW_C1, and the second compensation switch SW_C2 are closed, the third compensation switch SW_C3 is open, and vice-versa. By arranging the compensation switches in this manner, the same load is presented to both the input node 40 and the output node 42, making the RF switching circuitry 38 more suitable for series switching applications. Further, providing the third compensation switch SW_C3 prevents the first compensation diode D1 and the second compensation diode D2 from conducting current when the RF switching circuitry 38 is in an OFF state of operation.

Figure 7:
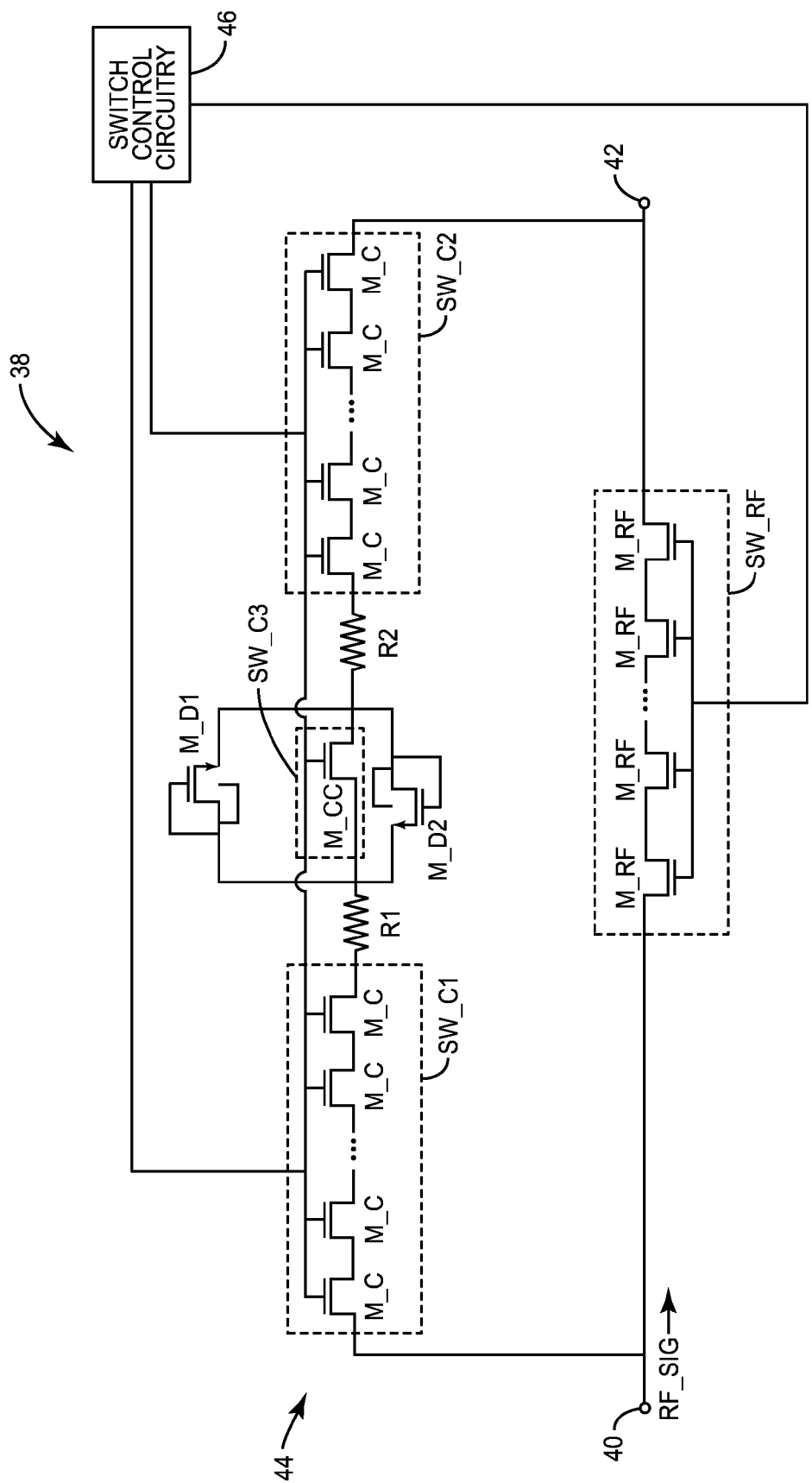
FIG. 7 shows a schematic representation of the radio frequency switching circuitry of FIG. 6 including details of the radio frequency switching circuitry according to one embodiment of the present disclosure.

FIG. 7 shows details of the RF switching circuitry 38 shown in FIG. 6. As discussed above, the RF switch SW_RF may comprise a plurality of series-coupled RF switching elements M_RF. Additionally, the first compensation switch SW_C1 and the second compensation switch SW_C2 may comprise a plurality of series-coupled compensation switching elements M_C. Further, the first compensation diode D1 and the second compensation diode D2 may comprise a first diode-connected transistor M_D1 and a second diode-connected transistor M_D2, respectively. Finally, the third compensation switch SW_C3 may comprise a complementary compensation switching element M_CC, such that the complementary compensation switching element M_CC remains closed when the first compensation switch SW_C1, the second compensation switch SW_C2, and the RF switch SW_RF are open, and vice versa. Accordingly, the complementary compensation switching element M_CC may be a PMOS transistor, while the RF switching elements M_RF and the compensation switching elements M_C may be NMOS transistors.

Figure 8:
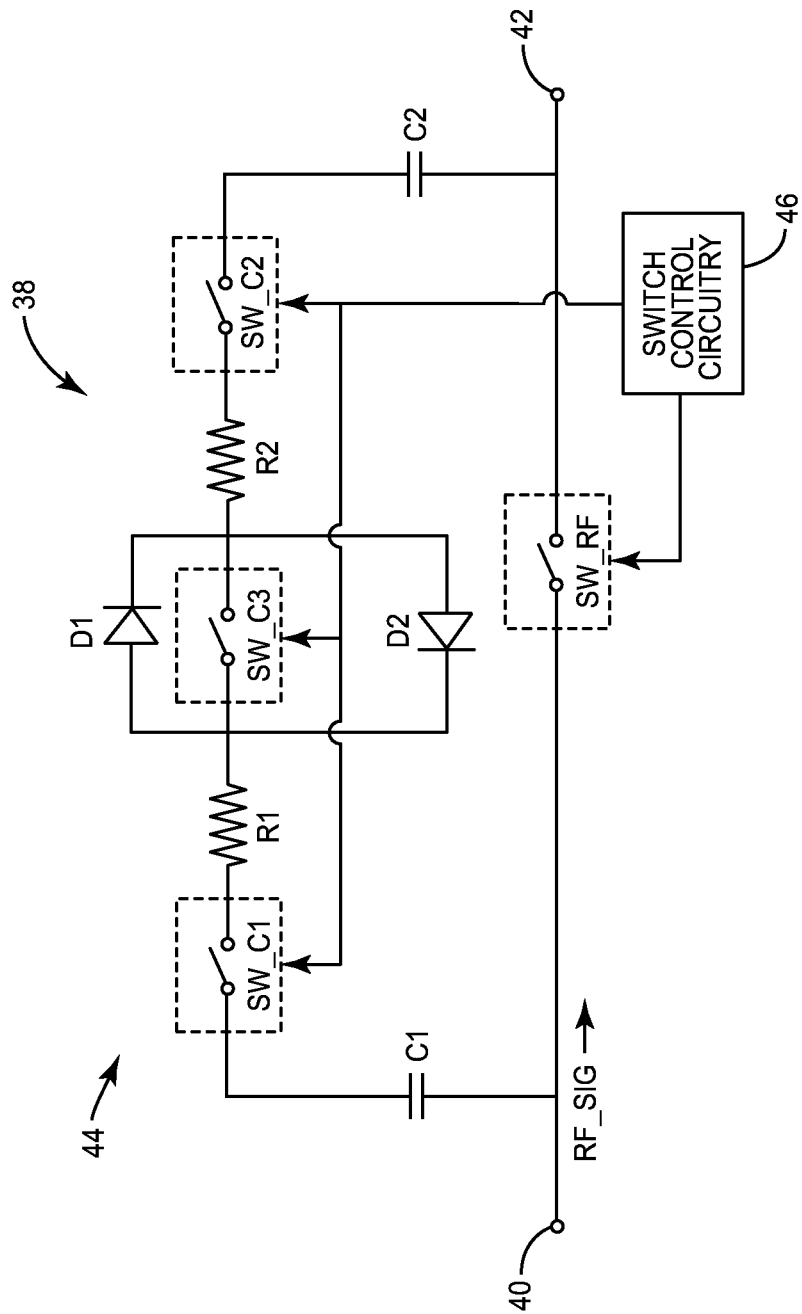
FIG. 8 shows a schematic representation of radio frequency switching circuitry including compensation circuitry according to an additional embodiment of the present disclosure.

FIG. 8 shows the RF switching circuitry 38 according to an additional embodiment of the present disclosure. The RF switching circuitry 38 shown in FIG. 8 is substantially similar to that shown in FIG. 7, but further includes a first compensation capacitor C1 and a second compensation capacitor C2. The first compensation capacitor C1 is coupled between the input node 40 and the first compensation switch SW_C1. The second compensation capacitor C2 is coupled between the second compensation switch SW_C2 and the output node 42. The first compensation capacitor C1 and the second compensation capacitor C2 allow a DC bias voltage to be applied across the distortion compensation circuitry 44 without affecting the RF signal RF_SIG. Accordingly, the first compensation switch SW_C1, the second compensation switch SW_C2, and the third compensation switch SW_C3 may be controlled independently from the RF switch SW_RF, thereby allowing for greater flexibility in the operation of the RF switching circuitry 38. For example, the distortion compensation circuitry 44 may be disabled independently of the RF switch SW_RF at very high or very low power levels where the compensation technique may not be helpful.

Figure 9:
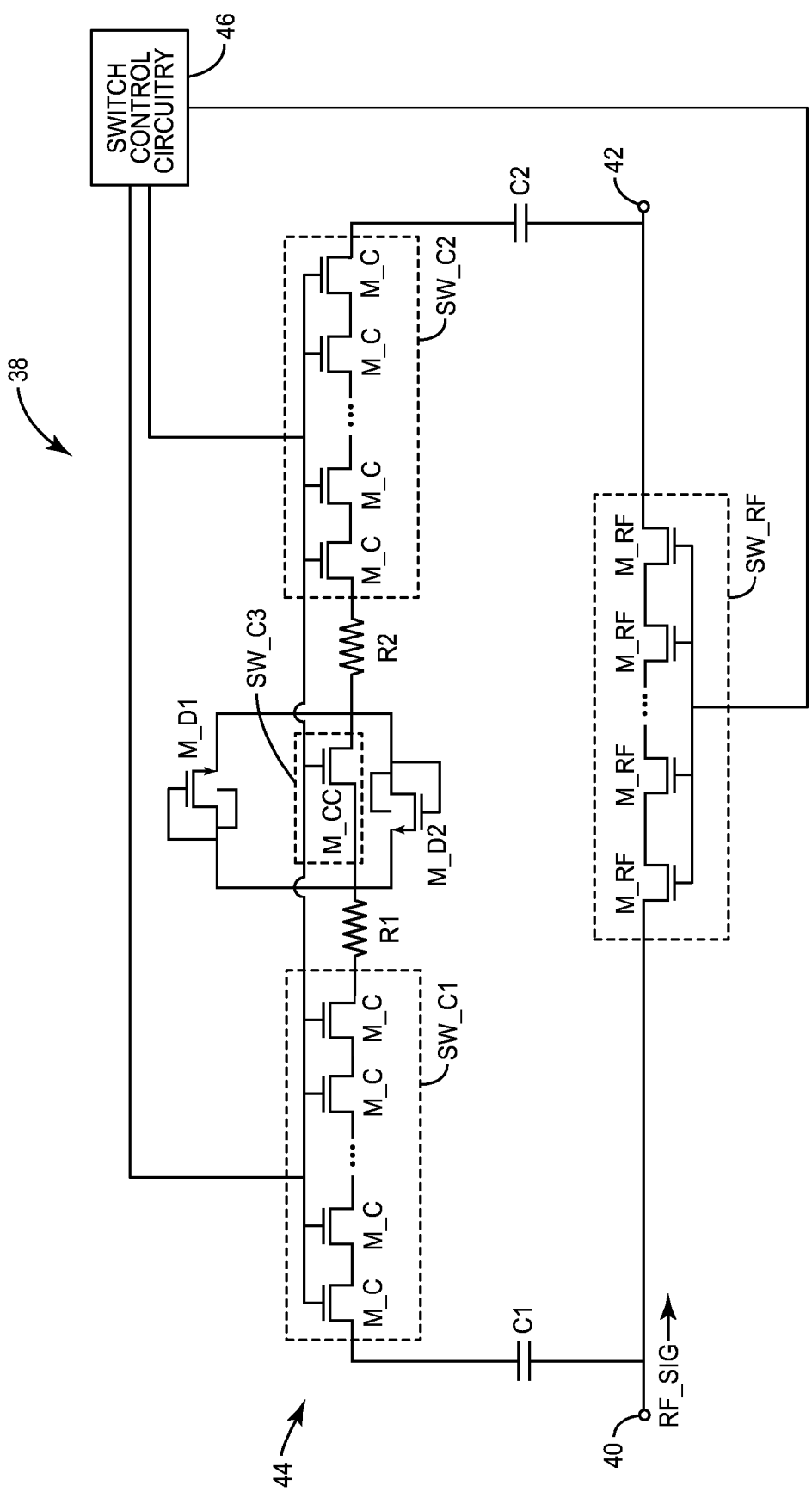
FIG. 9 shows a schematic representation of the radio frequency switching circuitry of FIG. 8 including details of the radio frequency switching circuitry according to one embodiment of the present disclosure.

FIG. 9 shows details of the RF switching circuitry 38 shown in FIG. 8. As discussed above, the RF switch SW_RF may comprise a plurality of series-coupled RF switching elements M_RF. Additionally, the first compensation switch SW_C1 and the second compensation switch SW_C2 may comprise a plurality of series-coupled compensation switching elements M_C. Further, the first compensation diode D1 and the second compensation diode D2 may comprise a first diode-connected transistor M_D1 and a second diode-connected transistor M_D2, respectively. Finally, the third compensation switch SW_C3 may comprise a complementary compensation switching element M_CC, such that the complementary compensation switching element M_CC remains closed when the first compensation switch SW_C1, the second compensation switch SW_C2, and the RF switch SW_RF are open, and vice versa. Accordingly, the complementary compensation switching element M_CC may be a PMOS transistor, while the RF switching elements M_RF and the compensation switching elements M_C may be NMOS transistors.

Figure 10:
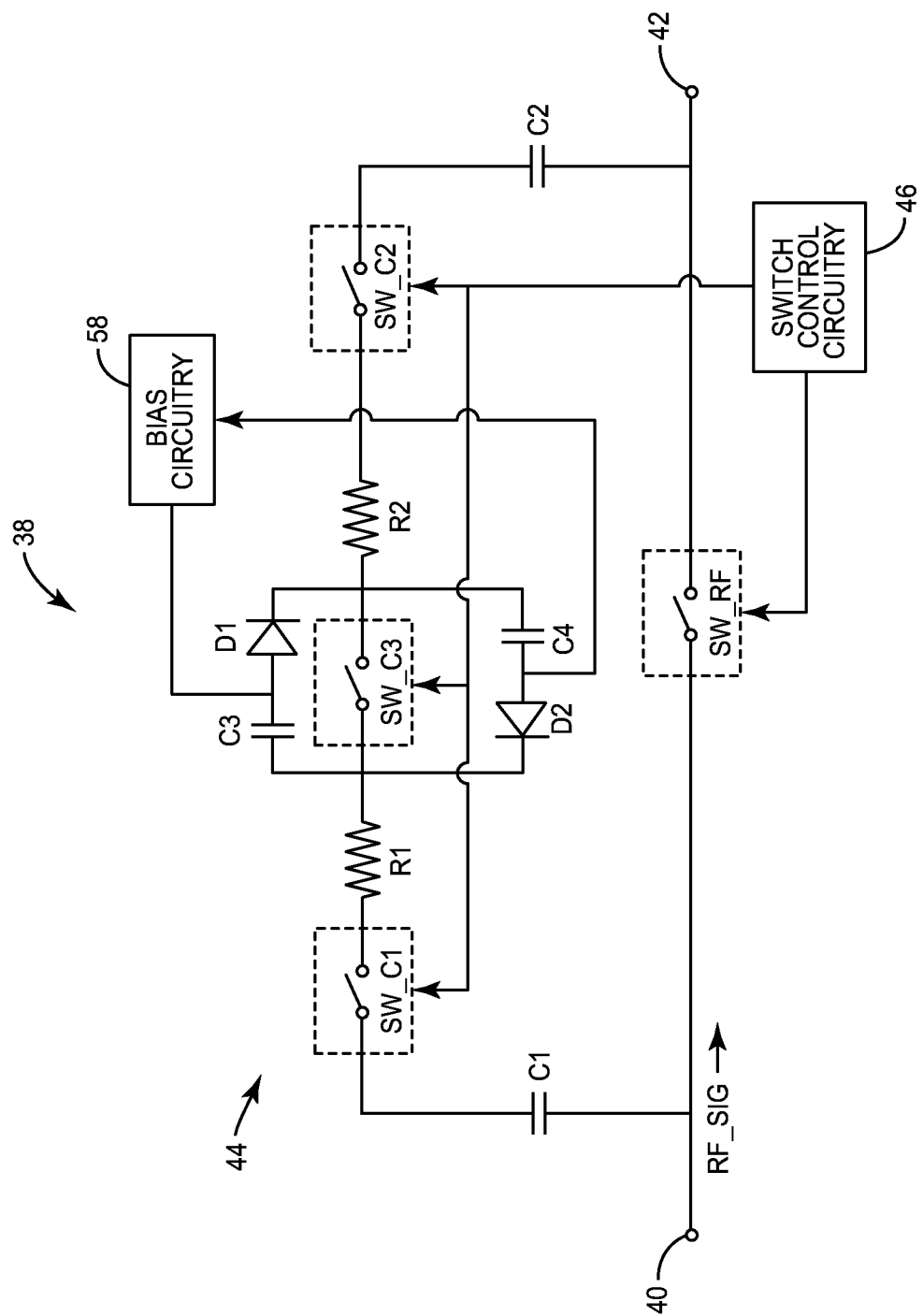
FIG. 10 shows a schematic representation of radio frequency switching circuitry including compensation circuitry according to an additional embodiment of the present disclosure.

FIG. 10 shows the RF switching circuitry 38 according to an additional embodiment of the present disclosure. The RF switching circuitry 38 shown in FIG. 10 is substantially similar to that shown in FIG. 8, but further includes a third compensation capacitor C3 and a fourth compensation capacitor C4, as well as compensation bias circuitry 58. The third compensation capacitor C3 is coupled in series between the first compensation resistor R1 and the anode of the first compensation diode D1. The fourth compensation capacitor C4 is coupled between the second compensation resistor R2 and the anode of the second compensation capacitor D2. The compensation bias circuitry 58 is coupled at the anode of each one of the first compensation diode D1 and the second compensation diode D2. Including the third compensation capacitor C3 and the fourth compensation capacitor C4 allows a DC bias voltage to be applied to the anode of each one of the first compensation diode D1 and the second compensation diode D2 without affecting the operation of the distortion compensation circuitry 44.

By applying a DC voltage to the anode of each one of the first compensation diode D1 and the second compensation diode D2, the voltage at the first compensation diode D1 and the second compensation diode D2 can be altered in order to change when each one of the diodes will become forward biased. Accordingly, the compensation bias circuitry 58 can control when the first compensation diode D1 and the second compensation diode D2 activate to control how much compensation is applied to the RF switching circuitry 38. For example, if a positive DC voltage is applied to the anode of the first compensation diode D1 and the second compensation diode D2, the threshold voltage of each one of the diodes will effectively be lowered. Accordingly, each one of the first compensation diode D1 and the second compensation diode D2 will become forward biased at a smaller differential voltage across the RF switch SW_RF, which will result in more compensation for distortion in the RF switching circuitry 38. As another example, if a negative DC voltage is applied to the anode of the first compensation diode D1 and the second compensation diode D2, the threshold voltage of each one of the diodes will effectively be heightened. Accordingly, each one of the first compensation diode D1 and the second compensation diode D2 will become forward biased at a larger differential voltage across the RF switch SW_RF, which will result in less compensation for distortion in the RF switching circuitry 38.

The compensation bias circuitry 58 may comprise, for example, a DC voltage source, an operational amplifier, a digital to analog converter, or a digital to analog converter with a temperature dependent reference. Those of ordinary skill in the art will appreciate that the compensation bias circuitry 58 may comprise any circuitry capable of applying a controlled DC voltage without departing from the principles of the present disclosure.

Figure 11:
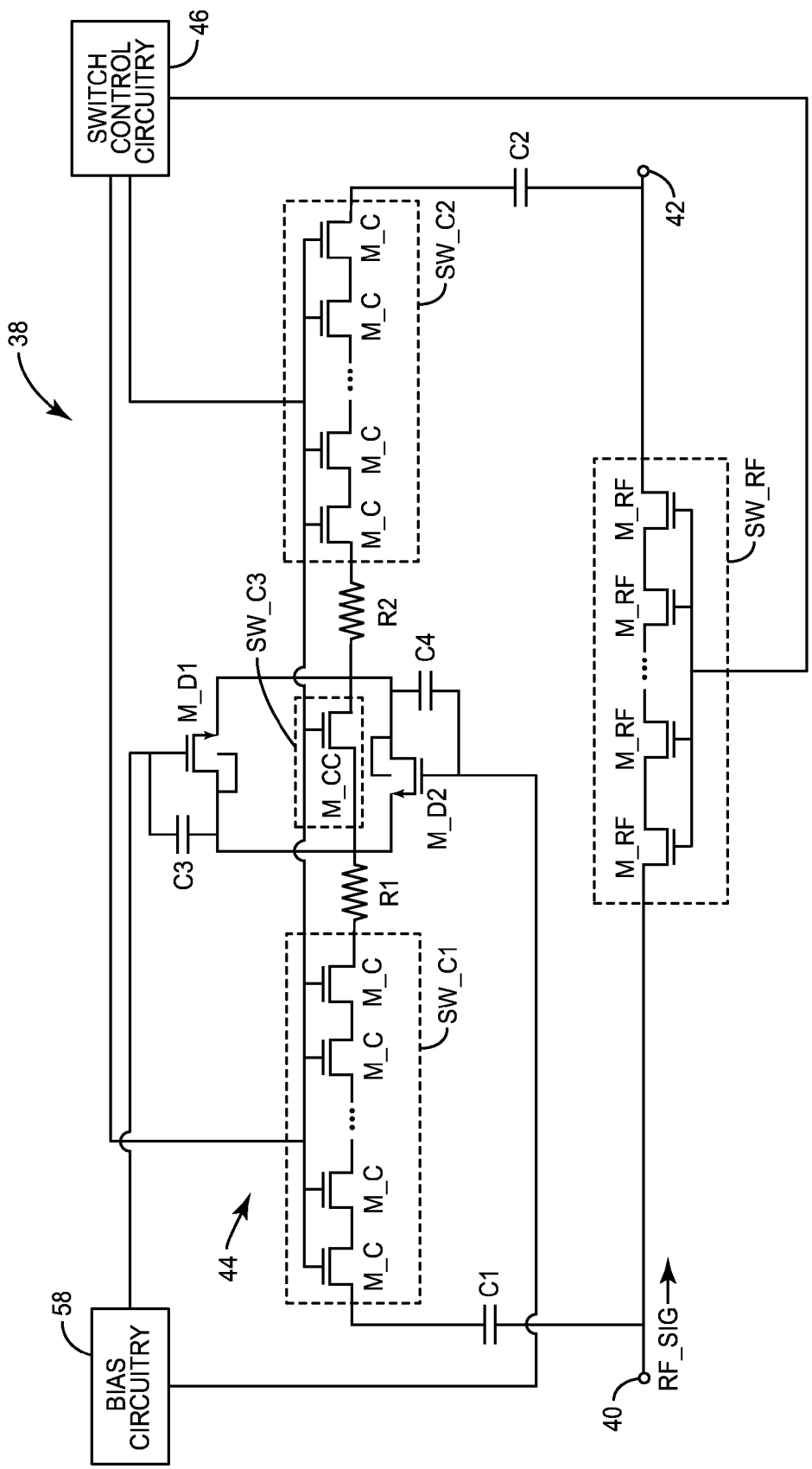
FIG. 11 shows a schematic representation of the radio frequency switching circuitry shown in FIG. 10 including details of the radio frequency switching circuitry according to one embodiment of the present disclosure.

FIG. 11 shows details of the RF switching circuitry 38 shown in FIG. 10. As discussed above, the RF switch SW_RF may comprise a plurality of series-coupled RF switching elements M_RF. Additionally, the first compensation switch SW_C1 and the second compensation switch SW_C2 may comprise a plurality of series-coupled compensation switching elements M_C. Further, the first compensation diode D1 and the second compensation diode D2 may comprise a first diode-connected transistor M_D1 and a second diode-connected transistor M_D2, respectively. Finally, the third compensation switch SW_C3 may comprise a complementary compensation switching element M_CC, such that the complementary compensation switching element M_CC remains closed when the first compensation switch SW_C1, the second compensation switch SW_C2, and the RF switch SW_RF are open, and vice versa. Accordingly, the complementary compensation switching element M_CC may be a PMOS transistor, while the RF switching elements M_RF and the compensation switching elements M_C may be NMOS transistors.

Any of the RF switching circuitry 38 described above with respect to FIGS. 3 and 5-11 may replace conventional RF switching circuitry to generate performance improvements in an RF device in which the RF switching circuitry 38 is incorporated. For example, the RF switching circuitry 38 described above may replace the conventional RF switching circuitry in any of the configurations described above in FIGS. 2A-2F to provide improved series RF switches, shunt RF switches, or RF tuning switches of any kind.

Figure 12:
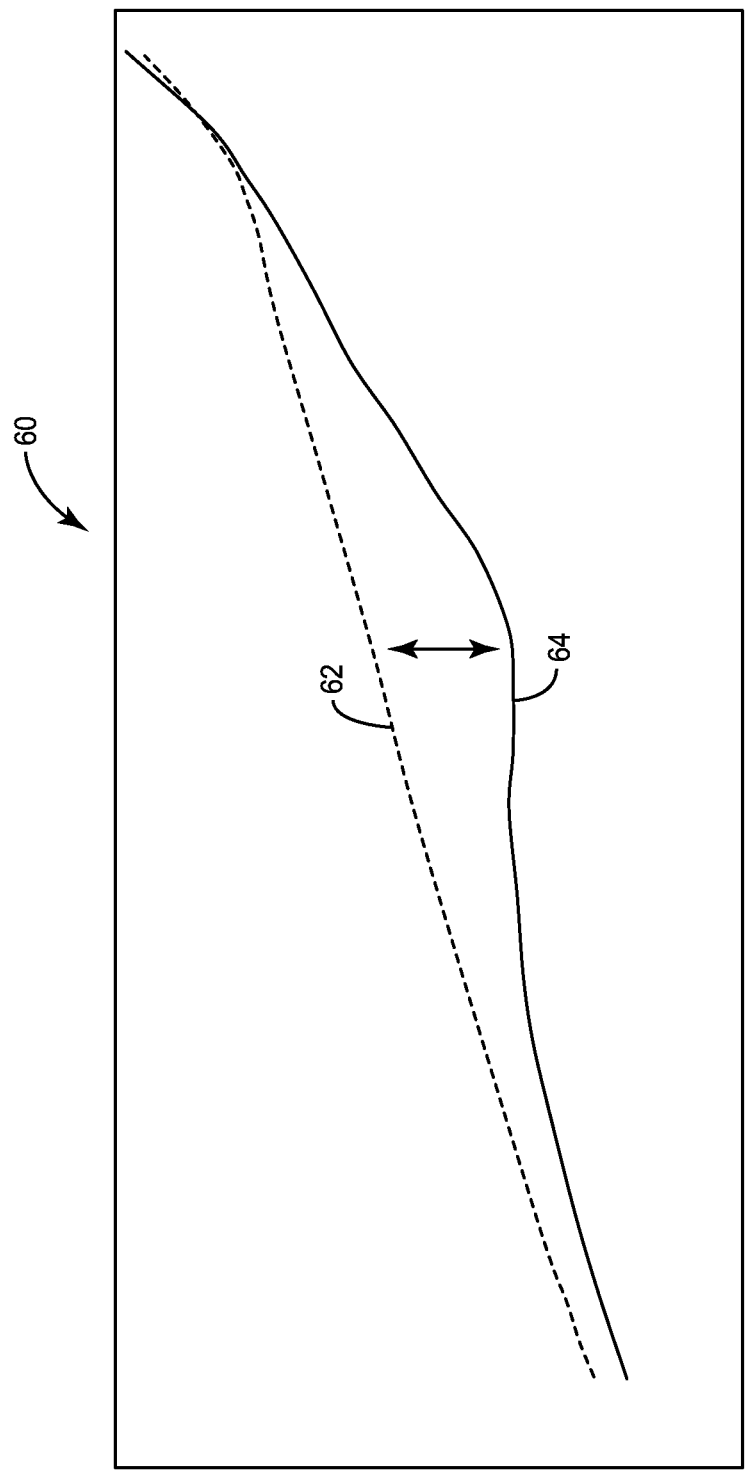
FIG. 12 shows a graph illustrating the advantages of the radio frequency switching circuitry including compensation circuitry with respect to conventional radio frequency switching circuitry.

FIG. 12 is a graph 60 depicting the harmonic power vs. the fundamental power of the RF switching circuitry with and without the distortion compensation circuitry 44. The dotted line 62 in FIG. 12 shows the third harmonic response of the RF switching circuitry 38 without the distortion compensation circuitry 44, while a solid line 64 in FIG. 12 shows the third harmonic response of the RF switching circuitry 38 with the distortion compensation circuitry 44. As shown in FIG. 12, there is a marked decrease in the third harmonic response of the RF switching circuitry 38 when the distortion compensation circuitry 44 is active. Accordingly, the performance of the RF switching circuitry 38 may be substantially improved.

Figure 13:
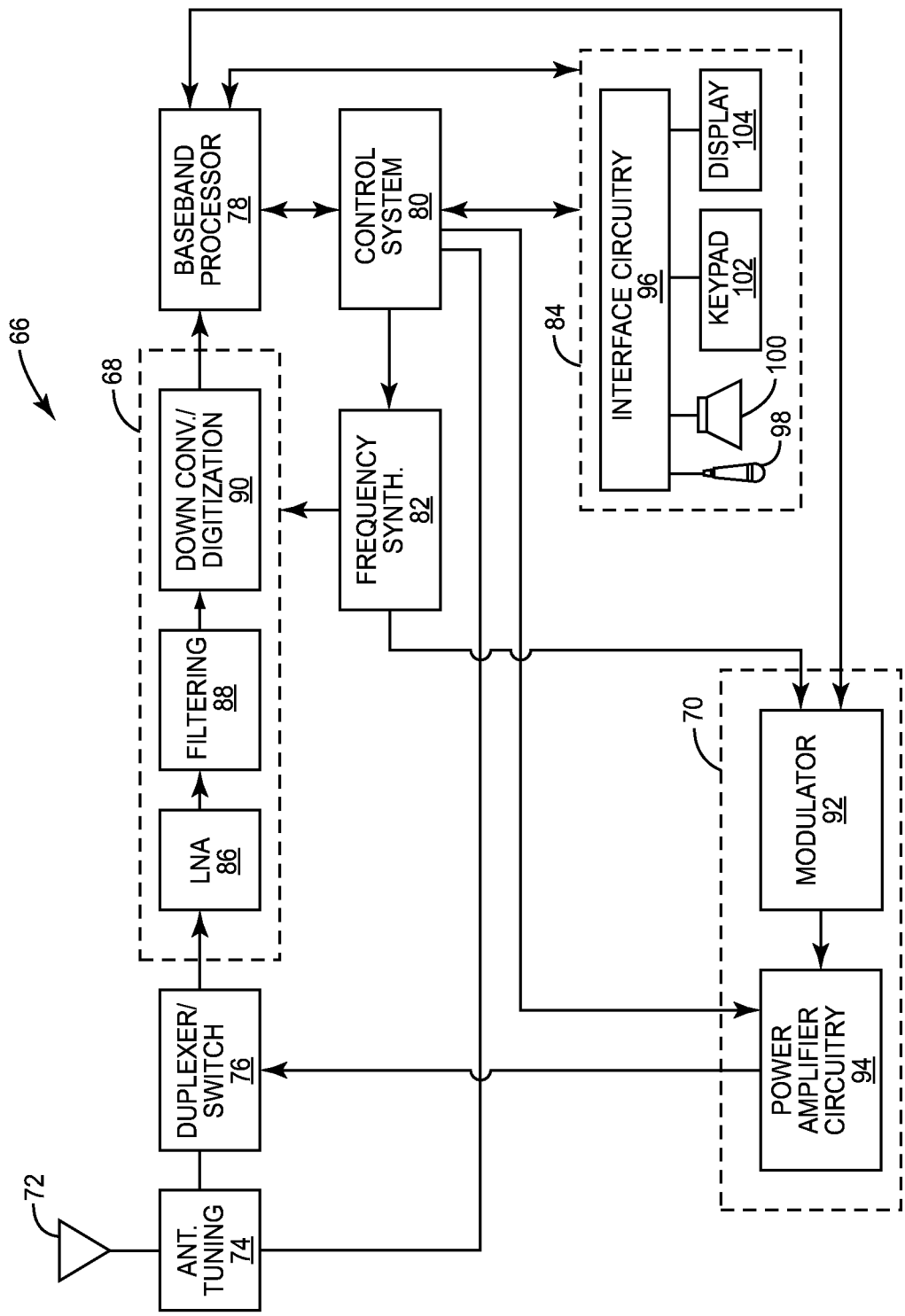
FIG. 13 shows a diagram illustrating a mobile terminal according to one embodiment of the present disclosure.

One application of the RF switching circuitry 38 shown in FIGS. 3, 5, 6, 7, 8, 9, 10, and 11 is in the antenna tuning circuitry used in a mobile terminal 66, the basic architecture of which is represented in FIG. 13. The mobile terminal 66 may include a receiver front end 68, a radio frequency transmitter section 70, an antenna 72, antenna tuning circuitry 74, a duplexer or switch 76, a baseband processor 78, a control system 80, a frequency synthesizer 82, and an interface 84. The receiver front end 68 receives information bearing radio frequency signals from one or more remote transmitters provided by a base station (not shown). The radio frequency signal is passed through the antenna tuning circuitry 74, which may include the RF switching circuitry 38 for switching one or more components into contact with the antenna 72 in order to alter the response of the antenna 72. A low noise amplifier (LNA) 86 amplifies the signal. Filtering circuitry 88 minimizes broadband interference in the received signal, while down conversion and digitization circuitry 90 down converts the filtered, received signal to an intermediate or baseband frequency signal, which is then digitized into one or more digital streams. The receiver front end 68 typically uses one or more mixing frequencies generated by the frequency synthesizer 82. The baseband processor 78 processes the digitized received signal to extract the information or data bits conveyed in the signal. This processing typically comprises demodulation, decoding, and error correction operations. As such, the baseband processor 78 is typically implemented in one or more digital signal processors (DSPs).

On the transmit side, the baseband processor 78 receives digitized data, which may represent voice, data, or control information, from the control system 80, which it encodes for transmission. The encoded data is output to the radio frequency transmitter section 70, where it is used by a modulator 92 to modulate a carrier signal at a desired transmit frequency. An RF power amplifier 94 amplifies the modulated carrier signal to a level appropriate for transmission, and delivers the amplified and modulated carrier signal to the antenna 72 through the duplexer or switch 76 and the antenna tuning circuitry 74.

A user may interact with the mobile terminal 66 via the interface 84, which may include interface circuitry 96 associated with a microphone 98, a speaker 100, a keypad 102, and a display 104. The interface circuitry 96 typically includes analog-to-digital converters, digital-to-analog converters, amplifiers, and the like. Additionally, it may include a voice encoder/decoder, in which case it may communicate directly with the baseband processor 78. Audio information encoded in the received signal is recovered by the baseband processor 78, and converted by the interface circuitry 96 into an analog signal suitable for driving the speaker 100. The keypad 102 and the display 104 enable the user to interact with the mobile terminal 66. For example, the keypad 102 and the display 104 may enable the user to input numbers to be dialed, access address book information, or the like, as well as monitor call progress information.

Those skilled in the art will recognize improvements and modifications to the embodiments of the present disclosure. All such improvements and modifications are considered within the scope of the concepts disclosed herein and the claims that follow.

What is claimed is:
1. Circuitry comprising:
  a radio frequency (RF) switch coupled between an input node and an output node and configured to selectively pass an RF signal from the input node to the output node based on a first switching control signal; and
  distortion compensation circuitry coupled in parallel with the RF switch between the input node and the output node, the distortion compensation circuitry configured to boost a portion of the RF signal that is being compressed by the RF switch when the amplitude of the RF signal is above a predetermined threshold by selectively injecting current into one of the input node or the output node.

2. The circuitry of claim 1 wherein the distortion compensation circuitry comprises:
a compensation switch; and
a first compensation diode coupled in an anti-parallel configuration with a second compensation diode to form an anti-parallel diode pair, such that the anti-parallel diode pair is coupled in series with the compensation switch between the input node and the output node.

3. The circuitry of claim 2 wherein the distortion compensation circuitry further comprises:
a first compensation resistor coupled between the input node and the anti-parallel diode pair; and
a second compensation resistor coupled between the anti-parallel diode pair and the compensation switch.

4. The circuitry of claim 2 wherein the compensation switch is controlled by a second switching control signal, such that when the RF switch is closed, the compensation switch is also closed, and when the RF switch is open, the compensation switch is also open.

5. The circuitry of claim 4 further comprising switching control circuitry configured to deliver the first switching control signal to the RF switch and the second switching control signal to the compensation switch.

6. The circuitry of claim 1 wherein the distortion compensation circuitry comprises:
a first compensation diode coupled in an anti-parallel configuration with a second compensation diode to form an anti-parallel diode pair;
a first compensation switch coupled between the input node and the anti-parallel diode pair;
a second compensation switch coupled between the output node and the anti-parallel diode pair; and
a third compensation switch coupled in parallel with the first compensation diode and the second compensation diode.

7. The circuitry of claim 6 wherein the distortion compensation circuitry further comprises:
a first compensation resistor coupled between the first compensation switch and the anti-parallel diode pair; and
a second compensation resistor coupled between the second compensation switch and the anti-parallel diode pair.

8. The circuitry of claim 7 further comprising:
a first compensation capacitor coupled between the input node and the first compensation switch; and
a second compensation capacitor coupled between the output node and the second compensation switch.

9. The circuitry of claim 8 wherein the first compensation switch, the second compensation switch, and the third compensation switch are controlled independently of the RF switch.

10. The circuitry of claim 8 further comprising:
a third compensation capacitor coupled between an anode of the first compensation diode and the first compensation resistor; and
a fourth compensation capacitor coupled between an anode of the second compensation diode and the second compensation resistor.

11. The circuitry of claim 10 further comprising compensation bias circuitry configured to provide a biasing voltage to the anode of the first compensation diode and the second compensation diode.

12. The circuitry of claim 6 wherein the first compensation switch and the second compensation switch comprise one or more NMOS transistors, and the third compensation switch comprises one or more PMOS transistors.

13. The circuitry of claim 12 wherein the first compensation switch, the second compensation switch, and the third compensation switch are controlled by a second switching control signal, such that when the RF switch is closed, the first compensation switch and the second compensation switch are also closed, while the third compensation switch is open, and when the RF switch is open, the first compensation switch and the second compensation switch are also open, while the third compensation switch is closed.

14. The circuitry of claim 13 further comprising switching control circuitry configured to deliver the first switching control signal to the RF switch and the second switching control signal to the first compensation switch, the second compensation switch, and the third compensation switch.

15. The circuitry of claim 1 wherein the distortion compensation circuitry is configured to boost a portion of the RF signal that is being compressed by the RF switch when the amplitude of the RF signal is above a predetermined threshold by selectively injecting current into the input node.

16. The circuitry of claim 1 wherein the distortion compensation circuitry is configured to boost a portion of the RF signal that is being compressed by the RF switch when the amplitude of the RF signal is above a predetermined threshold by selectively injecting current into the output node.

17. A mobile terminal comprising:
an antenna;
a receiver front end;
a radio frequency transmitter section; and
antenna tuning circuitry coupled between the antenna, the receiver front end, and the radio frequency transmitter section, the antenna tuning circuitry comprising:
a radio frequency (RF) switch coupled between an input node and an output node and configured to selectively pass an RF signal from the input node to the output node based on a first switching control signal; and
distortion compensation circuitry coupled in parallel with the RF switch between the input node and the output node, the distortion compensation circuitry configured to boost a portion of the RF signal that is being compressed by the RF switch when the amplitude of the RF signal is above a predetermined threshold by selectively injecting current into one of the input node or the output node.

18. The mobile terminal of claim 17 wherein the output node of the antenna tuning circuitry is coupled to a fixed impedance.

19. The mobile terminal of claim 18 wherein the antenna tuning circuitry is configured to alter the impedance presented to the antenna by selectively closing the RF switch.

20. The mobile terminal of claim 17 wherein the distortion compensation circuitry comprises:
a compensation switch; and
a first compensation diode coupled in an anti-parallel configuration with a second compensation diode to form an anti-parallel diode pair, such that the anti-parallel diode pair is coupled in series with the compensation switch between the input node and the output node.

21. The mobile terminal of claim 20 wherein the distortion compensation circuitry further comprises:
a first compensation resistor coupled between the input node and the anti-parallel diode pair; and
a second compensation resistor coupled between the anti-parallel diode pair and the compensation switch.

22. The mobile terminal of claim 20 wherein the compensation switch is controlled by a second switching control signal, such that when the RF switch is closed, the compensation switch is also closed, and when the RF switch is open, the compensation switch is also open.

23. The mobile terminal of claim 17 wherein the distortion compensation circuitry comprises:
   a first compensation diode coupled in an anti-parallel configuration with a second compensation diode to form an anti-parallel diode pair;
   a first compensation switch coupled between the input node and the anti-parallel diode pair;
   a second compensation switch coupled between the output node and the anti-parallel diode pair; and
   a third compensation switch coupled in parallel with the first compensation diode and the second compensation diode.

24. The mobile terminal of claim 23 wherein the distortion compensation circuitry further comprises:
   a first compensation resistor coupled between the first compensation switch and the anti-parallel diode pair; and
   a second compensation resistor coupled between the second compensation switch and the anti-parallel diode pair.

25. The mobile terminal of claim 24 wherein the distortion compensation circuitry further comprises:
   a first compensation capacitor coupled between the input node and the first compensation switch; and
   a second compensation capacitor coupled between the output node and the second compensation switch.

26. The mobile terminal of claim 25 wherein the first compensation switch, the second compensation switch, and the third compensation switch are controlled independently of the RF switch.

27. The mobile terminal of claim 25 wherein the distortion compensation circuitry further comprises:
   a third compensation capacitor coupled between an anode of the first compensation diode and the first compensation resistor; and
   a fourth compensation capacitor coupled between an anode of the second compensation diode and the second compensation resistor.

28. The mobile terminal of claim 27 wherein the distortion compensation circuitry further comprises compensation bias circuitry configured to provide a biasing voltage to the anode of the first compensation diode and the second compensation diode.

29. The mobile terminal of claim 23 wherein the first compensation switch and the second compensation switch comprise one or more NMOS transistors, and the third compensation switch comprises one or more PMOS transistors.

30. The mobile terminal of claim 29 wherein the first compensation switch, the second compensation switch, and the third compensation switch are controlled by a second switching control signal, such that when the RF switch is closed, the first compensation switch and the second compensation switch are also closed, while the third compensation switch is open, and when the RF switch is open, the first compensation switch and the second compensation switch are also open, while the third compensation switch is closed.

31. The mobile terminal of claim 30 further comprising switching control circuitry configured to deliver the first switching control signal to the RF switch and the second switching control signal to the first compensation switch, the second compensation switch, and the third compensation switch.

32. The circuitry of claim 17 wherein the distortion compensation circuitry is configured to boost a portion of the RF signal that is being compressed by the RF switch when the amplitude of the RF signal is above a predetermined threshold by selectively injecting current into the input node.

33. The circuitry of claim 17 wherein the distortion compensation circuitry is configured to boost a portion of the RF signal that is being compressed by the RF switch when the amplitude of the RF signal is above a predetermined threshold by selectively injecting current into the output node.

* * * * *